(12) United States Patent
Liu et al.

(10) Patent No.: US 6,773,730 B1
(45) Date of Patent: Aug. 10, 2004

(54) INGESTIBLE AND DEGRADABLE CHEWING GUM INCLUDING ENZYMATIC HYDROLYSATES OF PROTEINS

(75) Inventors: Jingping Liu, Highland Park, NJ (US); Weisheng Li, Montclair, NJ (US); Jack Foster, Piscataway, NJ (US)

(73) Assignee: Wm. Wrigley Jr. Company, Chicago, IL (US)

( * ) Notice: Subject to any disclaimer, the term of this patent is extended or adjusted under 35 U.S.C. 154(b) by 337 days.

(21) Appl. No.: 10/018,820

(22) PCT Filed: Nov. 9, 2000

(86) PCT No.: PCT/US00/07809

§ 371 (c)(1),
(2), (4) Date: Mar. 12, 2002

(87) PCT Pub. No.: WO01/01788

PCT Pub. Date: Jan. 11, 2001

Related U.S. Application Data

(60) Provisional application No. 60/141,603, filed on Jun. 30, 1999.

(51) Int. Cl.$^7$ ................................................ A23G 3/30
(52) U.S. Cl. .............................................. 426/3; 426/5
(58) Field of Search ........................................ 426/3, 5

(56) References Cited

U.S. PATENT DOCUMENTS

| | | |
|---|---|---|
| 2,154,482 A | 4/1939 | Weber |
| 2,469,861 A | 5/1949 | Cohoe |
| 2,489,147 A | 11/1949 | Lougovoy |
| 5,112,625 A | 5/1992 | Zibell et al. |
| 5,482,722 A | 1/1996 | Cook |
| 5,624,906 A | 4/1997 | Vermeer |
| 5,741,773 A | 4/1998 | Zhang et al. |

*Primary Examiner*—Arthur L. Corbin
(74) *Attorney, Agent, or Firm*—Bell, Boyd & Lloyd LLC

(57) ABSTRACT

Ingestible and degradable gum bases and chewing gums including enzymatically hydrolyzed zein are provided. Additionally, methods of producing gum base and chewing gums are provided.

31 Claims, 1 Drawing Sheet

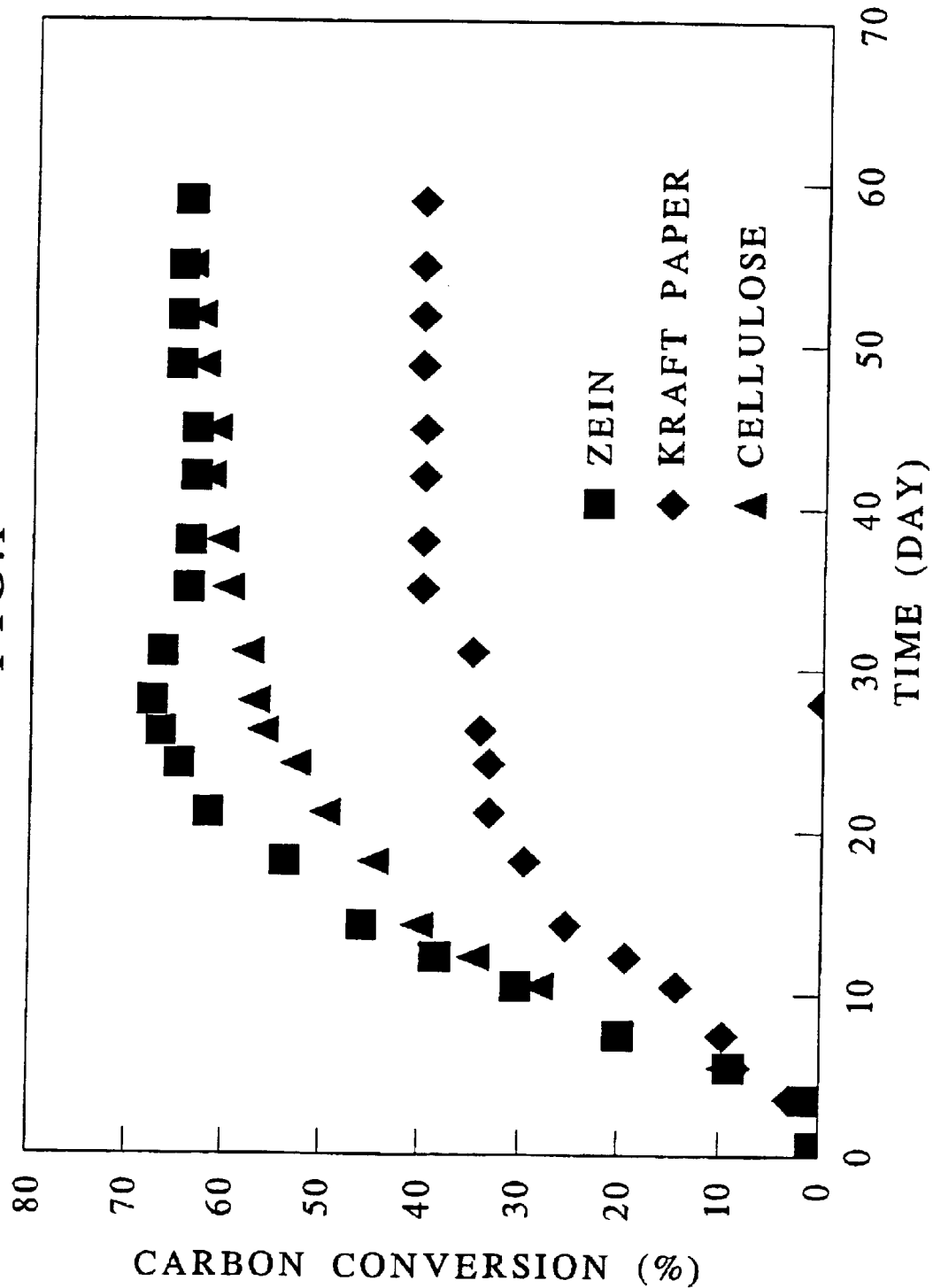

INGESTIBLE AND DEGRADABLE CHEWING GUM INCLUDING ENZYMATIC HYDROLYSATES OF PROTEINS

This application claims the benefit of provisional application Serial No. 60/141,603 filed Jun. 30, 1999.

BACKGROUND OF THE INVENTION

The present invention relates generally to chewing gum and the manufacture of same. More specifically, the present invention relates to chewing gum bases and methods and materials for manufacturing same.

Of course, it is known in the manufacture of chewing gum to use a gum base which is water-insoluble, the water-insoluble gum base is combined with water-soluble components such as flavors and sweeteners to produce chewing gum. The water-insoluble portion, or gum cud, is designed not to dissolve in the mouth of the chewer. This has resulted in conventional gum cuds that cannot be digested by the chewer. Accordingly, after chewing gum is chewed, the gum cud that remains that must be discarded. This can create a number of issues with respect to chewing gum.

Unfortunately, conventional gum cuds can easily adhere to any dry surface, such as wood, concrete, paper and cloth. When gum cuds are improperly discarded, they can be difficult to remove from such surfaces. At times, this has caused some environmental concerns.

The above factors may at times restrict the marketing and use of chewing gum. Accordingly, there has been a move to develop a chewing gum which is either ingestible or that creates a gum cud that is easily removable and degradable. However, this search has been elusive.

For example, typically ingestible polymers, such as proteins and polysaccharides, as compared to flexible elastomers that are used in conventional chewing gum, are rigid and therefore are not suitable as chewing elastomers. Moreover, in the presence of large amounts of plasticizers, such as water, alcohol, and glycerin or polyols, some proteins and polysaccharides become elastic at body temperature. On the other hand, some other ingestible polymers such as starches, albumins, globulins, due to their polar structures, have a tendency to quickly dissolve or disperse in the mouth of the chewer. Such ingestible polymers therefore cannot stand up to prolonged chewing.

Water insoluble ingestible polymers such as prolamines and glutelins have been explored for formulating ingestible chewing gums. However, the most effective prolamine solvents such as alcohol and polyol are still water-soluble or dispersable in water. They therefore can be extracted out during chewing. The texture of prolamines, such as zein, up after the alcohol plasticizers have been chewed out. Accordingly, water insoluble plasticizers are required in order to maintain a soft texture during prolonged chew. This requires the use of lipids such as beeswax, candelilla wax and fats to be used for this purpose in the presence of large amounts of emulsifiers.

Chewing gums comprising prolamines as well as zein have been used or proposed. See, for example, U.S. Pat. Nos. 2,154,482, 2,469,861, 2,489,147, 5,482,722 and 5,112,625. However, these products have not been entirely satisfactory from a chewing gum standpoint.

There is therefore a need for an improved chewing gum and gum base that is ingestible and/or biodegradable.

SUMMARY OF THE INVENTION

The present invention provides improved chewing gum and gum bases. The improved chewing gum and gun bases are ingestible and/or biodegradable.

To this end, the present invention provides a gum base comprising enzymatically hydrolyzed zein.

In an embodiment, the zein is hydrolyzed with a peptidase.

In an embodiment, the zein is hydrolyzed with a proteinase.

In an embodiment, the gum base includes a humectant.

In an embodiment, the gum base includes an emulsifier.

In an embodiment, the gum base includes a polysaccharide.

In an embodiment, the gum base includes an ingestible protein.

In an embodiment, the gum base includes a lipid.

In an embodiment, the enzymatically hydrolyzed zein comprises approximately 20% to about 65% percent by weight of the gum base.

In an embodiment, the gum base includes an edible acid.

In another embodiment of the present invention, a gum base is provided comprising an enzymatically hydrolyzed protein and a polysaccharide.

In a still further embodiment of the present invention, a chewing gum is provided. The chewing gum comprises an insoluble gum base including enzymatically hydrolyzed zein and a water soluble portion including a flavor and a sweetener.

In an embodiment, the zein is hydrolyzed with a peptidase.

In an embodiment, the zein is hydrolyzed with a proteinase.

In an embodiment, the chewing gum includes a humectant.

In an embodiment, the chewing gum includes an emulsifier.

In an embodiment, the chewing gum includes a polysaccharide.

In an embodiment, the chewing gum includes an ingestible protein.

In an embodiment, the chewing gum includes a lipid.

In an embodiment, the enzymatically hydrolyzed zein comprises approximately 20% to about 65% percent by weight of the chewing gum base.

In an embodiment, the zein is derived from corn.

In an embodiment, the chewing gum includes malt.

In an further embodiment of the present invention, a method for manufacturing a chewing gum is provided. The method comprises the steps of hydrolyzing zein using an enzyme and using the enzymatically hydrolyzed zein to produce a gum base.

In a still further embodiment of the present invention, a method for manufacturing chewing gum is provided. The method comprises the steps of providing a gum base including an enzymatically hydrolyzed zein; and mixing with the gum base a flavor and a sweetener to provide a finished chewing gum.

In an embodiment of the method, the finished chewing gum is heated. Accordingly, it is an advantage of the present invention to provide an improved chewing gum.

Another advantage of the present invention is to provide an improved gum base.

Still another advantage of the present invention is to provide a gum cud that is ingestible. Furthermore, an advantage of the present invention is to provide a chewing gum that produces a gum cud that does not cause environmental concerns if improperly discarded.

Further an advantage of the present invention is to provide new ingredients for constructing gum bases.

Another advantage of the present invention is to provide improved elastomers for constructing chewing gum.

Still an advantage of the present invention is to provide an improved method for manufacturing chewing gum.

Additional features and advantages of the present invention are described in, and will be apparent from, the detailed description of the presently preferred embodiments and the figure.

BRIEF DESCRIPTION OF THE FIGURE

FIG. 1 illustrates graphically carbon conversation versus biodegradation over time (days) for Kraft paper, cellulose, and enzymatic zein gum base.

DETAILED DESCRIPTION OF THE PRESENTLY PREFERRED EMBODIMENTS

The present invention provides improved chewing gum, improved gum bases, and methods of manufacturing same.

Pursuant to the present invention, an enzymatic hydrolysate of protein is used to construct chewing gum. Specifically, an enzymatic hydrolsate of zein is used. This affords a gum base, or chewing gum, having a number of advantages.

One of the essential requirements for a chewable material is that its glass transition temperature should not be higher than the temperature of the mouth of the chewer. It is well known that water is an important plasticizer for most food polymers. Water decreases the glass transition temperature of most biological materials from about 200° C. to about –10° C. or so under physiological conditions of water content.

Without water, most biopolymers would be glassy. For many polysaccharides and proteins, including zein, gelatin, gluten, starches and maltodextrins, their dry glass transition temperatures are in the range of 200° C. +/–50° C.; at a water content around 20+/–5% (wt.), their glass transition temperatures are around room temperature.

Human saliva consists mainly of water and can be a plasticizer for food polymers during chewing. For most hydrophilic food polymers, the water absorbing capacity is usually too high or is unlimited. This results in the dissolution or dispersion of the food polymers inside the mouth. Therefore, such products can not withstand prolonged chewing.

For hydrophobic food polymers such as zein, however, the water holding capacity is quite low, which results in a firm texture. Zein is composed of more than 50% nonpolar amino acid residuals such as leucine, isoleucine, valine, alamine, proline, and glutamine. This renders zein primarily soluble in alcoholic solvents and insoluble in water.

Chemically intact zein has a moisture absorption capacity of less than 20%. In order to make a lipid-free ingestible chewing gum with zein one must balance its water retention ability and water solubility.

Another important characteristic of chewing gums is the balance of easy deformation under small force and relatively high cohesive strength to prevent the gum from falling apart during chewing. In conventional chewing gums, tackifiers play an important role in balancing deformation and cohesion. For the same reason, low and medium molecular weight ingredients other than plasticizers are also required for ingestible gum.

Pursuant to the present invention, an enzymatic hydrolysate of zein is used to overcome these two problems. A significant improvement in solubility and foaming properties of zein is achieved. Enzymatic modification of zein exposes ionizable polar amino acids. These amino acids are capable of binding much more water than the nonionized polar groups in the intact zein. The water absorption capacity of zein hydrolyzate can be 10 times higher than that of normal zein. By controlling the degree of hydrolysis of zein, a desired water holding ability can be obtained. In other words, the enzymatic hydrolysates of the proteins results in a softer texture than its original form in a water-rich environment, such as the mouth.

Furthermore, due to the breakdown of the protein chain during the enzymatic treatment, a certain quantity of low and medium molecular weight protein fragments are produced. Due to the similarity of their chemical structure, these low and medium molecular weight species are compatible with zein, and behave more like tackifiers in conventional gum bases.

Commercially available zein has an average molecular weight of around 35,000 Dalton. After modification by proteases, such as papain, a hydrolysate having a molecular weight around 3,700 to about 5,400 Daltons can be produced. A zein product containing a certain amount of hydrolysate and water becomes quite chewable.

Usually, a protein backbone is not very reactive chemically. A peptide bond is hydrolyzed very slowly at neutral pH and room temperature. However, in the presence of protease, or at an extreme pH or high temperature, the process can be greatly accelerated. Pursuant to the present invention, enzymes including microbial (fungal or bacterial) proteases, plant extracted proteases, and their combinations can be used. Preferably, the proteases are endopeptidase; most preferably serine proteases or thio proteases or their combinations.

In this regard, proteins can be hydrolyzed by different types of proteases. The proteases that can catalyze the hydrolysis of protein can be divided into two categories: peptidase (exopeptidases); and proteinases (endopetidases). Exopeptidases catalyze the hydrolysis of the N-terminal and C-terminal ends of proteins. Endopeptidases catalyze the hydrolysis of peptide bonds within the protein chain.

Depending on the functional groups of the active sites (the amino acid (peptide) present), the proteases can be subdivided into serine proteinases, thio or cysteine proteinases, carboxyl or aspartic proteinases and metalloproteinases. Some proteases that can be used in the present invention include: the peptidase Validase FP II (obtained from Valley Research, Inc.) that contains a very high level of exopeptide; the proteinases Alcalase (obtained from Novo Nordisk BioChem North America, Inc.); Alkaline Protease (a bacterial protease liquid concentrate obtained from a non-genetically modified strain of *Bacillus licheniformis* (660 DAPU/g) obtained from Valley Research Inc; Validase TSP200 (obtained from Valley Research, Inc.), Protamex (obtained from Novo Nordisk BioChem North America, Inc.) and Neutrase (obtained from Novo Nordisk BioChem North America, Inc.) that are characterized primarily by their endopeptidase activities; Flavourzyme (obtained from Novo Nordisk BioChem North America, Inc.) contains both endopeptidase and exopeptidase. Two of the proteinases mentioned above (Alcalase, Alkaline Protease) improve the softness of zein hydrolsate significantly. Other proteinases showed moderate effect on the texture of zein after the process. Zein treated by peptidases showed little improvement on the texture.

Serine proteinases are characterized by the presence of unique serine hydroxyl groups on the side chain in each enzyme. There are two families of serine proteases: bacterial protease subtilisin; and trypsin family including chymotrypsin, trypsin, elastase, thrombin, plasmin, kallikrein and acrosin. Various serine proteases catalyze the hydrolysis reaction in very similar manners but, are different in their preferences for amino acid side chains at the cleaved peptide bonds and the residuals at the neighboring position. All highly purified proteases demostrated specificity for certain peptide bonds and have little or no action on other peptide bonds. Because chymotrypsin prefers to cleave the bonds after large hydrophobic residuals, it should be suitable for the zein hydrolysis. The subtilisin family has less distinct preferences at the residual on the cleaved peptide bond. It was found that the texture of zein treated by a subtilisin was soft and chewable. The resultant hydrolysates can be used as a chewing gum material.

In thiol protease, the cysteine side chain is the active site. Papain, ficin, bromelain and actinidin are typical thiol proteases. When trace amount of papain was mixed with zein in a humectant for 2.5 hours at 56° C., the partially hydrolyzed zein became much softer than one without papain, as shown in Table 1.

TABLE 1

Modulus* of Zein Hydrolysates

|  | zein without papain | zein with 0.2% papain |
|---|---|---|
| modulus (g/s) | 150 | 100 |

*moduli are measured from a punch test by use of a texture analyzer.

In carboxyl proteases, the carboxyl group, usually aspartyl, is the active site for catalyzing hydrolysis of proteins. Such proteases include pepsin, gastricsin and chymosin. The texture of zein can be modified by pepsin.

Metalloproteases employ bonded metals, such as $Zn^{++}$ and $Ca^{++}$ in their active sites. Carboxypeptidases A and B, thermolysin, angiotensin-converting enzyme, enkephalinase, collagenase ($Zn^{++}$) are examples of metalloproteases. When Neutrase, a metalloproteinase (Zn) produced by a selected stain of *Bacillus amyloliquefaciens*, was used to treat zein, the hydrolsate was firmer than the one treated by subtilisin or papain.

Alkaline Protease Concentrate, a bacterial protease liquid obtained from a non-genetically modified strain of *Bacillus licheniformis* (660DAPU/g) is an example of a protease complex. When zein was treated by trace amount of Alkaline Protease Concentrate at 60° C. for 1 hour in aqueous propylene glycol, it produced a long-lasting gum-like chewing texture.

The degree of hydrolysis and the structure of the peptides produced, determines the properties of a protein hydrolsate. This in turn is dependent on the nature of the protein and the specificity of the enzyme used, as well as the hydrolysis conditions such as pH and temperature, time and solvents.

Due to the hydrophobic nature of zein, a homogeneous enzymatic hydrolysis of zein is very difficult to perform under the conditions for water-soluble proteins. For example, when the papain-catalyzed hydrolysis of zein was carried out in a homogeneous 70% ethanol solution, zein was hydrolyzed to a limited extent and the hydrolysates had a considerably higher molecular weight compared to the products obtained in a suspension system. Fortunately, it has also been found that zein hydrolysates with a degree of hydrolysis less than 2% contained many components in different sizes. The mixtures of polypeptides had substantially increased solubility even with such a low degree of hydrolysis.

The enzymatic zein of the present invention can be used as a mastication material alone in the presence of water and with other humectants. It can also be combined with other ingestible ingredients to make ingestible gum bases having improved taste and texture. Other ingestible ingredients include, but are not limited to one or more of the following materials: polysaccharides; proteins or their hydrolysates; ingestible acids; emulsifiers; and lipids. Polysaccharides include, but are not limited to: native starches; modified starches; dextrins; maltodextrim; hydroxypropylmethylcellulose; dietary fibers; pectins; alginates carageenan; gellan gum; xanthan gum; gum arabic; and guar gum or other natural gums. The preferred polysaccharides are maltodextrin and high-conversion dextrins. In a preferred embodiment, the chewing gun bases comprise approximately 5 to about 10% (wt.) polysaccharides. Among digestible proteins, hydrolyzed collagens or gelatins can be used.

The addition of fats to the enzymatic zein containing gum bases had little effect on the final gum texture when the content of fats was lower than approximately 12% (wt). Soya oil slightly decreased the hardness, modulus and springiness, and increased the adhesive force as compared to partially hydrogenated soy oil. The addition of fat-encapsulated acids, such as citric acid and ascorbic acid, slightly decreased the hardness, modulus and adhesive force, increased the springiness of the finish gums.

As noted above, gelatins can also be used in the gum base. When used, the preferred content of gelatin is around 10 to about 20% (wt.) of the base. By adding other protein hydrolysates, for example gelatin hydrolsate, hydrocolloids such as guar flour, pectin, maltodextrin and acids one can reduce any bitter taste that may be present in the enzymatic zein. High molecular weight hydrolyzed gelatin can also decrease the adhesive force and increase the springiness of the gums. The addition of starches and dextrin can increase the sugar-holding capacity of the gum bases.

In an embodiment of the invention an ingestible and chewable gum base is provided that is derived from the enzymatic hydrolysate of corn proteins. The corn proteins comprise mainly zein.

Pursuant to the present invention, a method for preparing ingestible and chewable enzymatic hydrolsate of zein is also provided. The method of this invention can, but not necessarily, involve the blending of zein, an enzyme and humectant in a batch mixer. This can be done at approximately 20° C. to about 65° C. for approximately 1 to about 2 hours. In a preferred embodiment, the process is performed at a temperature of approximately 45° C. to about 60° C. In an embodiment the method comprises blending enzymatic zein, polysaccharides, proteins and/or fats with emulsifiers. This can be done at approximately 20° C. to about 65° C., preferably at approximately 35° C. to about 45° C. for approximately 1 hour.

In a further embodiment of the present invention, sugarless, ingestible chewing gums are provided comprising enzymatic hydrolsate of zein, one or more high-intensity sweeteners, flavors and in a preferred embodiment, bitterness masking agents. The high-intensity sweeteners can include aspartame, alitame, acesulfame, acesulfame salt, sucralose, saccharin, cyclamic acid, thaumatin, monellin, glycyrrhizin, dihydrochalcones and stevioside; the preferred amount of high-intensity sweeteners is approximately 0.5 to about 2% in the finished gum. The enzymatic zein gums can comprise approximately 0.5 to about 2% (wt.) flavors such as strawberry, spearmint, vanilla, etc. The preferred bitterness masking agent is malt with a preferred content of approximately 5 to about 50% (wt.) in the finished gums.

In another embodiment, the ingestible chewing gums comprise one of the gum bases described above, one or more flavors, preferably one or more bitterness masking agents, one or more sugars and/or one or more high-intensity sweeteners. Sugars can include monosaccharides, disaccharides and/or oligosaccharides such as sucrose, dextrose, maltose, fructose, levulose, galactose and their combinations. Preferably, a sugar content of approximately 30 to about 50% (wt.) is provided in the finished chewing gum.

At or above 100° C., all the enzymes will lose their activity almost immediately. However, when the enzyme deactivation procedure took place right after the hydrolysis, crosslinking of the hydrolysates and the loss of humectant due to the high deactivation temperature made it difficult to blend the hydrolsate with other gum ingredients for further processing. This resulted in crumbly finished gums. In contrast, there was little effect on the gum texture when the thermal deactivation of enzymes was carried out immediately after the gum was made. In an embodiment of the present invention, the finished chewing gum is heated at an elevated temperature for a short period of time. The preferred conditions are approximately 90° C. to about 110° C. for aproximately 3 to about 20 minutes in a closed systems.

Pursuant to the present invention, the humectants that can be used include aqueous glycols, polyols or alcohols. In a preferred embodiment, aqueous propylene glycol is used. The water content in the humectants should be approximately 5 to about 60%, preferably approximately 30 to about 60% and most preferably, 40 to about 60% by weight. The higher the water content in the humectants, the better the taste of the hydrolysates.

The protein to humectant ratio should be approximately 0.2 to about 3.0, preferably approximately 0.5 to about 2, and most preferably approximately 1 to about 1.5.

The peptide bonds cleaved during hydrolysis may form sub-units that react with other proteins or non-proteins. The content of free amino acids or the residuals with amine or carboxyl side chains will increase with an increase of the hydrolysis degree. The pH value of the entire system tends to decrease in the absence of a buffer solution. The buffer can help to achieve a hydrolysis degree (HD) of the hydrolysates. Gum-grade hydrolysate can be prepared with or without buffer.

Table 2 (below) illustrates hydrolysis time versus the degree of hydrolysis. After a one-hour hydrolysis, zein became soft and chewable with HD around 1.8%.

TABLE 2

| Hydrolysis time vs. hydrolysis degree | | |
| --- | --- | --- |
| time (min.) | 30 | 60 |
| pH (1% wt solution) | 5.48 | 5.41 |
| hydrolysis degree % | 0.8 | 1.8 |

Table 3 (below) sets forth the ratio of protein to enzyme versus the modulus of the gum. The ratio of protein to enzyme also greatly affected the texture of the hydrolysate. With an increase of papain content, the modulus decrease The papain/zein ratio was perhaps the most significant factor on the gun texture, such as hardness, modulus, gumminess, chewiness and springiness; it also had some impact on cohesiveness and adhesive force. Table 3 demonstrates that the higher the papain/zein ratio the softer the gum.

TABLE 3

| Papain/zein ratio vs. modulus of the gums | |
| --- | --- |
| | Modulus (g/s) |
| control | 393+/−40 |
| 0.2% papain* | 232+/−12 |
| 0.4% papain* | 77+/−5 |

*activity = 160 MCU/mg

As noted above, the enzymatic zein gum base will be biodegradable. When zein was exposed to aerobic biodegradation pursuant to ASTM D-5209 by contacting with activated sewage sludge innoculum, its degradation rate was faster than both Kraft paper and cellulose as illustrated in FIG. 1. The weight loss was 100% after about 80 days in sewage sludge. This indicated that zein would degrade completely in less than three months.

The present invention can be used to construct a variety of chewing gums. The chewing gum includes a base portion.

A variety of ingredients can be used with zein to construct the gum base. Preferably as a gum base one or more of the following ingredients is added to the hydrolysate. Edible proteins such as, but not limited to, gelatin, collagen, casein, caseinates, gliadin gluten, gluten, hordein and their combinations can be used. Protein hydrolysates such as but not limited to hydrolyzed gelatin, hydrolyzed collagen, hydrolyzed gluten may also be used alone or in combination. Food grade microbial (fungal or bacterial) proteases or plant protease exacts which contain thiol proteinases, or serine proteinases, or carboxyl proteinases, or metalloproteinases or their combinations such as but not limited to subtilisin, chymotrypsin, trypsin, elastase, thrombin, plasmin, kallikrein, acrosin, papain, ficin, bromelain, actinidin, pepsin, gastricsin, chymosin, carboxypeptidases A and B, thermolysin, enkephalinase, collagenase. Humectant such as, but not limited to, aqueous glycol, polyol alcohol or their combinations such as water, propylene glycol, glycerin, polyethylene glycol, ethanol propanol may also be used in the base. Food grade polysaccharides such as, but not limited to, native starches, modified starches, dextrins, maltodextrin, hydroxyethylcellulose, hydroxypropylcellulose, dietary fibers, pectins, alginates, carrageenan, gellan gum, xanthan gum, gum arabic, guar gum or other natural gums may be used in the base; the preferred polysaccharides are maltodextrin and high-conversion dextrins. Bitterness masking agents such as, but not limited to, malt, anethole, gelatin hydrolysate, guar flour, pectin, maltodextrin, sodium salts, lithium salt, phosphatidic acid, phosphatidyl inositol, ribonucleotide, acidic oligopecptides, lipoproteins and their combinations may also be used in the base. Ingestible minerals such as, but not limited to, calcium carbonate, calcium citrate, calcium lactate may also be used in the base. Ingestible materials such as, but not limited to, beeswax, candilliba wax may also be used in the base. Edible fats such as, but not limited to, soya, cotton seed oil, palm oil, corn oil, peanut oil, cocoa butter and their hydrogenates may also be used in the base. Edible acids such as, but not limited to, citric acid, fumaric acid, lactic acid, malic acid, tartaric acid, ascorbe acid, sorbic acid, succinic acid and its anhydride, adipic acid, propionic acid may also be used in the base. Emulsifier such as, but not limited to, monoglycerides, diglycerides, propylene glycol ester, lactoglycerides, succinylated monoglycerides, acetoglycerides, sorbitan ester, polyglcerol esters, citroglycerides, polysorbates, polyglycerol polyricinoleate may also be used in the base.

Preferably, the zein hydrolysate comprises approximately 25% to about 55% by weight of the gum base.

Gum formulas may comprise from about 10 to about 95 weight percent a gum base made in accordance with the present invention in a gum formula typically known to those in the art. The chewing gum may comprise softeners, sweeteners, flavoring agents and combinations thereof. The sweeteners often fill the role of buling agents in the gum. The bulking agents generally comprise from about 5 percent to about 90 percent, preferably from about 20 percent to about 80 percent.

Softeners are added to the chewing gum in order to optimize the chewability and mouth feel of the gun. Softeners typically constitute from about 0.5 percent to about 25.0 percent by weight of the chewing gum. Softeners contemplated for use in the gum include glycerin, lecithin and combinations thereof. Further, aqueous sweetener solutions such as those containing sorbitol, hydrogenated starch hydrolysates, corn syrup and combinations thereof may be used as softeners and bulking agents in gum. Sugar-free formulations are also typical.

Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

The sweetener for use in the present invention can also be used in combination with sugarless sweetener. Generally, sugarless sweeteners include components with sweetening characteristics but which are devoid of the commonly known sugars and comprise, but are not limited to, sugar alcohols such as sorbitol, mamitol, xylitol, hydrogenated starch hydrolysates, maltitol and the like, alone or in any combination.

Depending on the particular sweetness release profile and shelf-life stability needed, bulk sweeteners of the present invention can also be used in combination with coated or uncoated high-intensity sweeteners or with high-intensity sweeteners coated with other materials and by other techniques.

High-intensity sweeteners, or artificial sweeteners and peptide sweets as they may be referred to, typically may include, but arm not limited to, alitame, thaumatin, aspartame, sucralose, acesulfame, saccharin and dihydrochalcones. The range of these sweetener types in gum typically may range from about 0.02 to about 0.10 weight percent for sweeteners such as alitame, thaumatin and dihydrochalcones, and from about 0.1 to about 0.3 weight percent for sweeteners like aspartame, sucralose, acesulfame and saccharin. A flavoring agent may be present in the chewing gum in an amount within the range of from about 0.1 to about 10.0 weight percent and preferably from about 0.5 to about 3.0 weight percent of the gum. The flavoring agents may comprise essential oils, synthetic flavors, or mixtures thereof including, but not limited to, oils derived from plants and Suits such as citrus oils, fruit essences, peppermint oil, spearmint oil, clove oil, oil of witergreen, anise and the like. Artificial flavoring components are also contemplated for use in gums of the present invention. Those skilled in the art will recognize that natural and artificial flavoring agents may be combined in any sensory acceptable blend. All such flavors and flavor blends are contemplated for use in gums of the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the initial ingredients have been thoroughly mixed, the gum mass is discharged from the mixer and shaped into the desired form such as by rolling into sheets and cutting into sticks, extruded into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent/sweetener. Further portions of the bulking agent/sweetener may then be added to the mixer. A flavoring agent is typically added with the final portion of the bulking agent/sweetener. A high-intensity sweetener is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

By way of example, and not limitation, examples of the preset invention will now be given.

EXAMPLE 1

Preparation of Zein Hydrolysate by Enzyme Complex

A propylene glycol (PG) aqueous solution was prepared by mixing PG and water at a ratio of 1:1 by weight. Alkaline Protease Concentrate (APC, 0.25 grams) was then added into the PG aqueous solution (25 grams). To a 100-ml sigma-blade mixer, set at 60° C. and 30 rpm, the zein (25 grams) and APC solution was added. After one hour of mixing, a homogenous, syrup-like paste was obtained. The paste was cooled to room temperature, and 0.5 g citric acid was added to deactivate the enzyme. The soft paste was then ready to be used for preparing the gums.

EXAMPLE 2

Preparation of Zein Hydrolysate by Thio Protease

A propylene glycol (PG) aqueous solution was prepared by mixing PG and water at a ratio of 3:2 by weight Liquid papain (dried latex from papaya fruit, 165 MCU/mg, 0.4 grams) was then added into 25 g PG aqueous solution. To a 100-ml sigma-blade mixer, set at 50° C. and 30 rpm, zein (25 grams) and the above papain solution were added. After one hour of mixing, a homogenous, syrup-like paste was obtained. By raising the temperature to 90° C. for one half hour, the papain was deactivated in a closed system. The resultant product was cooled to room temperature, and a soft solid was ready for preparing the gums.

EXAMPLE 3

Preparation of Zein Hydrolysate by Serine Protease

A propylene glycol (PG) aqueous solution was prepared by mixing PG and water at a ratio of 3:2 by weight. Alcalase (2.4 AU/g, 0.25 grams) was then added into the PG aqueous solution (25 grams). The main component in Alcalase is subtilisin carlsberg from the selected strain of *Bacillus licheniformis*. To a 100-ml sigma-blade mixer, set at 50° C. and 30 rpm, zein (25 grams) and the above Alcalase solution were added. After two-hours of mixing, a homogenous, syrup-like paste was obtained. The enzyme was inactivated for 10 minutes at 85° C. before discharge. The soft paste was ready for preparing the gums.

EXAMPLE 4

Preparation of Zein Hydrolysate by Metalloprotease

A propylene glycol (PG) aqueous solution was prepared by mixing PG and water at a ratio of 3:2 by weight. Neutrase (0.5 AU/g, 1.0 grams) was then added into PG a aqueous solution (25 grams). Neutrase (0.5 AU/g) is a bacterial proteinase produced by a selected strain of bacillus amyloliquefaciens. To a 100-ml sigma-blade mixer, set at 50° C. and 30 rpm, zein (25 grams) and the above Neutrase solution were added. After two-hours of mixing, a slight phase separation was observed.

EXAMPLE 5

Preparation of Zein Hydrolysate by Exopetidase

The propylene glycol (PG) aqueous solution was prepared by mixing PG and water at a ratio of 3:2 by weight. Validase FP II (50,000 CFAU/g, 0.25 grams) was then added into the PG aqueous solution (25 grams). Validase FP II (50,000 CFAU/g) is an exo-peptidase produced by the controlled fermentation of *Aspergillus oryzae*. To a 100-ml sigma-blade mixer, set at 53° C. and 30 rpm speed, zein (25 grams) and the above Validase FP II solution were added. After two and a half hours of mixing, the blend was discharged. It was chewable, but firmer than the hydrolysate from example 1.

EXAMPLE 6

Preparation of Zein Hydrolysate by an Endopeptidase

A propylene glycol (PG) aqueous solution was prepared by mixing PG and water at a ratio of 3:2 by weight. Validase TSP200 (200 NU/g, 0.25 grams) was then added into the PG aqueous solution (25 grams). Validase TSP200 (200 NU/g) is an endopeptidase produced by the controlled fermentation of *Bacillus subtilis*. To a 100-ml sigma-blade mixer, set at 55° C. and 30 rpm, zein (25 grams) and the above Validase TSP200 solution were added. After two and a half hours of mixing, the blend was discharged. It was chewable, but firmer than the hydrolysate from example 1.

EXAMPLE 7

Preparation of Zein Hydrolysate by Protease Complex

A propylene glycol (PG) aqueous solution was prepared by mixing PG and water at a ratio of 3:2 by weight. Protamex (1.5 AU/g, 0.25 grams) was then added into the PG aqueous solution Protamex (1.5 AU/g) is a bacterial protease complex produced by the controlled fermentation of *Bacillus*. To a 100-ml sigma-blade mixer, set at 40° C. and 30 rpm, zein (25 grams) and the above Protamex solution were added. After two and a half hours of mixing, the blend was discharged. It was chewable, but firmer than the hydrolysate from example 1.

EXAMPLE 8

Preparation on of Zein Hydrolysate by Protease Complex

A propylene glycol (PG) aqueous solution was prepared by mixing PG and water at a ratio of 3:2 by weight Flavourzyme (1000 LAPU/g, 0.25 grams) was then added into 25 ml of the PG aqueous solution. Flavourzyme (1000 LAPU/g) is a fungal protease complex produced by the fermentation of a selected strain of *Aspergillus oryzae*. To a 100-ml sigma-blade mixer, set at 50° C. and 30 rpm, zein (25 grams) and the above Flavourzyme solution were add. After two and a half hour mixing, phase separation occurred.

EXAMPLE 9

Preparation of Gum Base from Enzymatic Hydrolysate of Zein

To a 100 ml sigma-blade batch mixer, set at 50° C. and 60 rpm, hydrolysates prepared pursuant to examples 1–3 (50 grams), maltodextrin (5 grams), hydrolyzed gelatin (MW= 15 K, 10 grams) and citric acid (0.5 grams) were added and blended for about two minutes. Then the mixer was set to 37° C. The base was mixed for another 60 minutes. A homogenous dough-like gum base was obtained.

EXAMPLE 10

Preparation of Gum Base from both Enzymatic Hydrolysate of Zein and non-hydrolyzed Zein To a 100 ml sigma-blade mixer, set at 50° C. and 60 rpm, hydrolysate prepared in Example No. 1 (50 grams), zein (1.5 grams), maltodextrin (5 grams), and hydrolyzed gelatin (MW=15 K, 10 grams) were added and blended for about two minutes. Then the mixer was re-set to 37° C. The base was mixed for another 60 minutes. A homogenous dough-like gum base was obtained

EXAMPLES 11

Preparation of Gum Base

To a 100 ml sigma-blade mixer, set at 55° C. and 60 rpm, hydrolysate prepared in Example No. 2 (50 grams), glyceryl monolaurate (1.56 grams) and partially hydrogenated soy oil (7.81 grams) were added and mixed for about 10 minutes. Then, maltodextrin (5 grams), and hydrolyzed gelatin (MW=15 K, 10 grams) were added and blended for about two minutes. Then the mixer was re-set to 37° C. The base was mixed for another 60 minutes. A homogenous dough-like gum base was obtained.

EXAMPLE 12

Preparation of Sugarless Chewing Gum from Enzymatic Hydrolysate of Zein

A propylene glycol (PG) aqueous solution was prepared by mixing PG and water at a ratio of 1:1 by weight Alkaline Protease Concentrate (APC, 0.25 grams) was then added into 17 ml of PG aqueous solution To a 100-ml sigma-blade mixer, set at 60° C. and 30 rpm, zein (25 grams) and the above APC solution were added. After one hour of mixing, malt powder (10 grams) was added and mixed for 40 minutes. Then the mixer was set at 370° C. and 60 rpm. Acesulfame K (0.5 grams) and strawberry flavor (0.5 ml) were added and mixed for another 10 minutes before discharge.

EXAMPLE 13

Preparation of Sugarless Chewing Gum from Base Contained Enzymatic Hydrolysate of Zein and Other Food Ingredients To a 100-ml sigma-blade mixer set at 600° C. and 60 rpm, the base prepared in Example No. 9 (63 grams) and malt powder (10 grams) were added and mixed for 5 minutes. Them the mixer was re-set to 37° C. and the blend was mixed for another 40 minutes. Then, acesulfame K (0.5 grams) and strawberry flavor (0.5 ml) were added and mixed for another 10 minutes before discharge.

EXAMPLE 14

Preparation of Sugar-containing Chewing Gum

To a 100-ml sigma-blade mixer at 60° C. and 60 rpm, the base prepared in Example No. 10 (63 grams), sugar(30 grams) and malt powder (10 grams) were added and mixed for 5 minutes. Then the mixer was re-set to 370° C. and the blend was mixed for another 40 minutes. Then, acesulfame K (0.5 grams) and strawberry flavor (0.5 ml) were added and mixed for another 10 minutes.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A chewing gum base comprising enzymatically hydrolyzed zein.
2. The gum base of claim 1 wherein the zein is hydrolyzed with a peptidase.
3. The gum base of claim 1 wherein the zein is hydrolyzed with a proteinase.
4. The gum base of claim 1 including a humectant.
5. The gum base of claim 1 including an emulsifier.
6. The gum base of claim 1 including an ingestible protein.
7. The gum base of claim 1 including a lipid.
8. The gum base of claim 1 wherein the enzymatically hydrolyzed zein comprises approximately 20% to about 65% percent by weight of the gum base.
9. The gum base of claim 1 including an edible acid.
10. The gum base of claim 1 wherein the zein is derived from corn.
11. A chewing gum base comprising enzymatically hydrolyzed zein and a polysaccharide.
12. The gun base of claim 11 including a humectant.
13. The gum base of claim 11 including an emulsifier.
14. The gum base of claim 11 including an ingestible protein.
15. The gum base of claim 11 including a lipid.
16. The gum base of claim 11 wherein the enzymatically hydrolyzed zein comprises approximately 20% to about 65% percent by weight of the gum base.
17. The gum base of claim 11 including an edible acid.
18. A chewing gum comprising:
   a gum base including enzymatically hydrolyzed zein; and
   a flavor and a sweetener.
19. The chewing gum of claim 18 wherein the zein is hydrolyzed with a peptidase.
20. The chewing gun of claim 18 wherein the zein is hydrolyzed with a proteinase.
21. The chewing gum of claim 18 including a humectant.
22. The chewing gum of claim 18 including an emulsifier.
23. The chewing gun of claim 18 including a polysaccharide.
24. The chewing gum of claim 18 including a digestible protein.
25. The chewing gum of claim 18 including a lipid.
26. The chewing gum of claim 18 wherein the enzymatically hydrolyzed zein comprises approximately 20% to about 65% percent by weight of the gum base.
27. The chewing gum of claim 18 wherein the zein is derived from corn.
28. The chewing gum of claim 18 including malt.
29. A method for making chewing gum base comprising the steps of
   hydrolyzing zein using an enzyme; and
   adding the enzymatically hydrolyzed zein to a chewing gum base.
30. A method for making chewing gum comprising the steps of:
   providing a gum base including an enzymatically hydrolyzed zein; and
   mixing the gum base with a flavor and a sweetener to provide a finished chewing gum.
31. The method of claim 30 wherein the finished chewing gum is heated.

* * * * *